(12) United States Patent
Von Fange et al.

(10) Patent No.: US 11,257,475 B2
(45) Date of Patent: Feb. 22, 2022

(54) MICRO-PERFORATED WOOD VENEER ACOUSTIC PANEL

(71) Applicant: S.J. Morse Company, Capon Bridge, WV (US)

(72) Inventors: Jesse C. Von Fange, Winchester, VA (US); David W. Pancake, Romney, WV (US)

(*) Notice: Subject to any disclaimer, the term of this patent is extended or adjusted under 35 U.S.C. 154(b) by 278 days.

(21) Appl. No.: 16/445,551

(22) Filed: Jun. 19, 2019

(65) Prior Publication Data

US 2019/0392809 A1    Dec. 26, 2019

Related U.S. Application Data

(60) Provisional application No. 62/687,311, filed on Jun. 20, 2018.

(51) Int. Cl.
| | |
|---|---|
| *G10K 11/168* | (2006.01) |
| *B32B 3/26* | (2006.01) |
| *B32B 21/10* | (2006.01) |
| *B32B 27/32* | (2006.01) |
| *B32B 21/14* | (2006.01) |
| *B32B 21/08* | (2006.01) |

(52) U.S. Cl.
CPC ............ *G10K 11/168* (2013.01); *B32B 3/266* (2013.01); *B32B 21/08* (2013.01); *B32B 21/10* (2013.01); *B32B 21/14* (2013.01); *B32B 27/32* (2013.01); *B32B 2262/101* (2013.01); *B32B 2307/102* (2013.01)

(58) Field of Classification Search
CPC .... G10K 11/168; G10K 11/162; B32B 3/266; B32B 3/12; B32B 21/08; B32B 21/10; B32B 21/14; B32B 27/32; B32B 2262/101; B32B 2307/102; Y10T 428/24149; Y10T 428/24273; Y10T 428/24322; Y10T 428/24165
See application file for complete search history.

(56) References Cited

U.S. PATENT DOCUMENTS

| | | |
|---|---|---|
| 3,822,762 A | 7/1974 | Crispin et al. |
| 4,403,013 A | 9/1983 | Robitschek et al. |
| 4,630,416 A | 12/1986 | Lapins et al. |
| 4,661,392 A | 4/1987 | Kapstad |
| 4,690,848 A | 9/1987 | Hering |
| 5,661,273 A | 8/1997 | Bergiadis |
| 6,696,167 B2 | 2/2004 | Sean et al. |
| 6,913,667 B2 | 7/2005 | Nudo et al. |
| 8,490,355 B2 | 7/2013 | Walker |

(Continued)

FOREIGN PATENT DOCUMENTS

| | | |
|---|---|---|
| CN | 202137986 | 2/2012 |
| CN | 105015080 | 11/2015 |

(Continued)

OTHER PUBLICATIONS

Translation of CN202137986U. (Year: 2012).*

*Primary Examiner* — Catherine A. Simone
(74) *Attorney, Agent, or Firm* — Benjamin C. Rothermel, Esq.

(57) ABSTRACT

The present disclosure relates to an acoustic panel having a fiberglass layer and a panel disposed on the fiberglass layer, the panel having perforations formed therethrough, wherein the acoustic panel has a noise reduction coefficient of at least 0.7.

15 Claims, 7 Drawing Sheets

(56) References Cited

U.S. PATENT DOCUMENTS

| | | | |
|---|---|---|---|
| 9,688,056 | B2 | 6/2017 | Beuchel et al. |
| 9,691,370 | B1 * | 6/2017 | Stone .................. G10K 11/168 |
| 9,805,708 | B2 | 10/2017 | Kim |
| 2005/0147790 | A1 | 7/2005 | Levavasseur |
| 2007/0102238 | A1 | 5/2007 | Low |
| 2008/0086957 | A1 | 4/2008 | Averill |
| 2008/0306702 | A1 | 12/2008 | Stone et al. |
| 2011/0076470 | A1 | 3/2011 | Zaveri |
| 2013/0295378 | A1 | 11/2013 | Bonin et al. |
| 2015/0197942 | A1 | 7/2015 | Pervan et al. |
| 2015/0197943 | A1 | 7/2015 | Ziegler et al. |
| 2016/0088941 | A1 | 3/2016 | Snowbarger |
| 2017/0190156 | A1 | 7/2017 | Lundblad et al. |

FOREIGN PATENT DOCUMENTS

| | | |
|---|---|---|
| EP | 1758733 | 3/2007 |
| EP | 2006462 | 12/2008 |
| FR | 2931495 | 11/2009 |
| FR | 3043588 | 5/2017 |
| WO | 2016016621 | 2/2016 |
| WO | 2016049056 | 3/2016 |

* cited by examiner

MICRO-PERFORATED WOOD VENEER ACOUSTIC PANEL

CROSS-REFERENCE TO RELATED APPLICATION

This application claims the benefit of U.S. Provisional Patent Application No. 62/687,311, filed on Jun. 20, 2018, which is hereby incorporated by reference for all purposes as if fully set forth herein.

BACKGROUND

Field

The present disclosure relates to a panel for acoustic absorption.

Background

Noise in enclosed or interior spaces may be distracting or problematic to the occupants' ability to converse or concentrate. Further, there may be spaces where the interior acoustics must be tuned to meet specific requirements, such as performing art spaces, classrooms, or studios. Acoustic panels may reduce interior noise, creating a better environment for occupants. Currently, a variety of wall and ceiling panel treatments are used to reduce interior noise. These may be fabric wrapped panels, wood-wool panels, fiberglass panels, and panels with various holes, grooves, or other modifications to the plane of the panel face. Conventional wood veneer panels may have a stiff construction that predominately only allow sound absorption through holes in the panel face thereof.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide an acoustic panel including a micro-perforated wood veneer panel and a perforated fiberglass layer.

Additional features of the disclosure will be set forth in the description which follows, and in part will be apparent from the description, or may be learned by practice of the disclosure.

An exemplary embodiment of the present disclosure discloses an acoustic panel having a fiberglass layer, a panel disposed on the fiberglass layer, the panel having perforations formed therethrough, wherein the acoustic panel has a noise reduction coefficient of at least 0.7.

Another exemplary embodiment of the present disclosure discloses an acoustic panel having a fiberglass layer having second perforations formed therein, and a wood veneer panel disposed on the fiberglass layer, the wood veneer panel having first perforations formed therethrough. The first perforations have a diameter of about 0.5 mm and the second perforations have a diameter of about 7.0 mm, and the acoustic panel has a noise reduction coefficient in a range of 0.7 to 0.75.

Another exemplary embodiment of the present disclosure discloses an acoustic panel having a core having second perforations formed therein, and a wood veneer panel disposed on the core, the wood veneer panel having first perforations formed therethrough.

BRIEF DESCRIPTION OF THE DRAWINGS

The accompanying drawings, which are included to provide a further understanding of the present disclosure and are incorporated in and constitute a part of this specification, illustrate exemplary embodiments of the present disclosure, and together with the description serve to explain the principles of the present disclosure.

DETAILED DESCRIPTION OF THE ILLUSTRATED EMBODIMENTS

The present disclosure is described more fully hereinafter with reference to the accompanying drawings, in which exemplary embodiments of the present disclosure are shown. The present disclosure may, however, be embodied in many different forms and should not be construed as limited to the exemplary embodiments set forth herein. Rather, these exemplary embodiments are provided so that this disclosure is thorough, and will fully convey the scope of the present disclosure to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or to layer, there are no intervening elements or layers present.

Acoustic panels according to exemplary embodiments of the present disclosure include a micro-perforated wood veneer layer disposed on a low-density fiberglass layer that improves dynamic response of the entire face of the panels to low-frequency sound waves. The acoustic panels according to the present exemplary embodiments absorb sound in a two-fold manner, through absorption of sound waves into the micro-perforations and by mechanical action of the entire panel face itself. This mechanical action allows the acoustic panels to perform significantly better at absorbing low-frequency sound waves (80-400 Hz) than conventional wood veneer panels.

Figure 1:
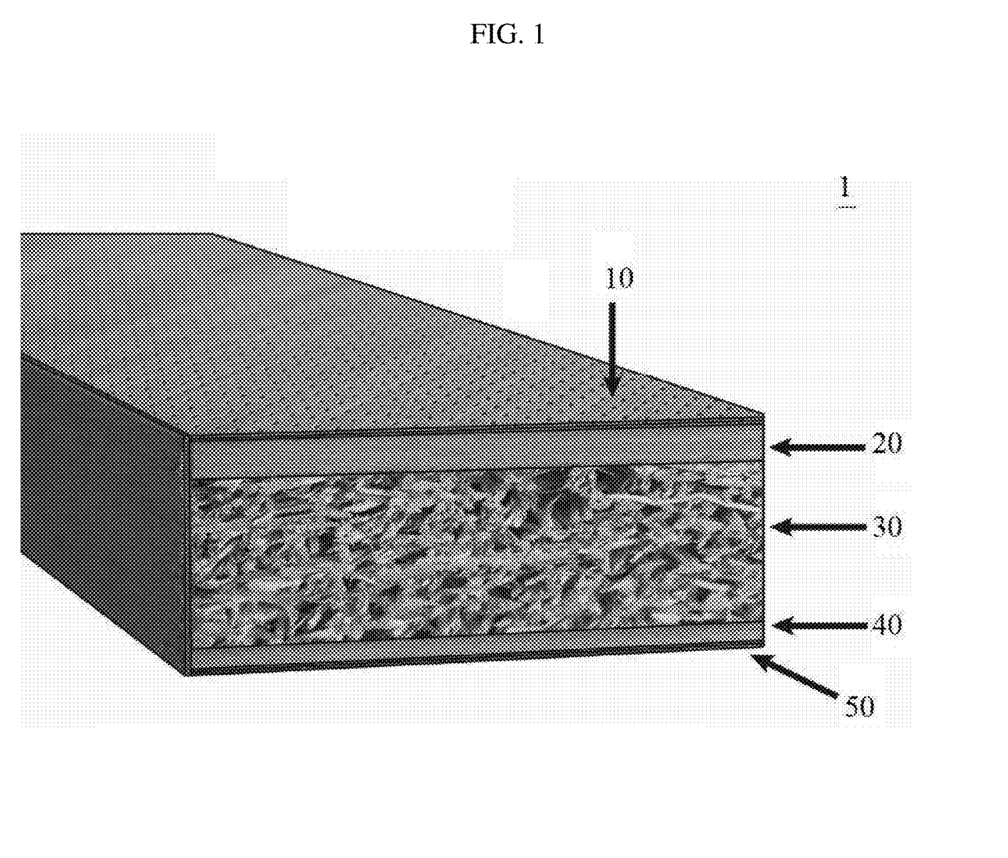
FIG. 1 is an isometric view showing an acoustic panel according to an exemplary embodiment of the present disclosure.

As shown in FIG. 1, the acoustic panel 1 according to an exemplary embodiment includes a wood veneer panel 10 having micro-perforations formed therethrough. The wood veneer panel 10 has a thickness of 1.5 mm. The wood veneer panel 10 is disposed on a multi-ply core including three layers of absorptive, porous materials: a first fiberglass layer 20; a wood-wool layer 30; and a second fiberglass layer 40. The first fiberglass layer 20, wood-wool layer 30, and second fiberglass layer 40 have thicknesses of 6 mm, 15 mm, and 3 mm, respectively. According to another exemplary embodiment, the first fiberglass layer 20, wood-wool layer 30, and second fiberglass layer 40 have thicknesses of 3 mm, 18 mm, and 3 mm, respectively. The acoustic panel 1 is backed with a sheet of wood veneer 50 to balance the panel and prevent warping, the wood veneer backing sheet 50 having a thickness of 1.5 mm. The fibers of the first and second fiberglass layers 20 and 40 are oriented to run substantially parallel to the face of the wood veneer panel 10.

In the acoustic panel 1 according to the present exemplary embodiment, the wood veneer panel 10 is pressed onto the first fiberglass layer 20, which has a very low density, enabling the wood veneer panel 10 to have improved dynamic response to low-frequency sound waves. Reflection of low-frequency sound waves by the wood veneer panel 10 is decreased, thus the acoustic panel 1 absorbs more of those sound waves. Both the first and second fiberglass layers 20 and 40 each has a fiberglass density of 18 lb/ft³.

An adhesive is used to adhere the wood veneer panel 10 to the first fiberglass layer 20, as well as adhere the other adjacent layers in the acoustic panel 1 to each other. The adhesive may be a glue which is porous and randomly structured, and which does not melt into and fill the micro-perforations in the wood veneer panel 10 during pressing. According to the present exemplary embodiment, the glue between the wood veneer panel 10 and the first fiberglass layer 20 has a weight of 0.7 oz, and the glue is disposed between the first fiberglass panel 20 and the wood-wool layer 30, the wood-wool layer 30 and the second fiberglass panel 40, and the second fiberglass panel 40 and the wood veneer backing sheet 50, each of these glue layers having a weight of 1.2 oz. Thus, an acoustically penetrable bond is created between the wood veneer panel 10 and the first fiberglass layer 20, as well as between the other layers, so as not to impede the transmission of sound waves as they pass through the wood veneer panel 10 and into the multi-ply core, where they can be effectively absorbed.

Figure 10A:
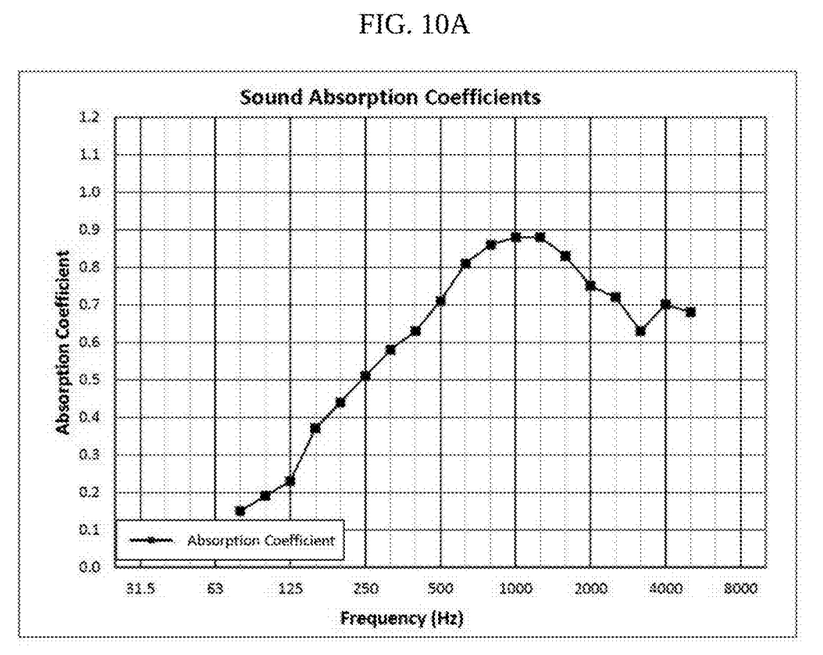
FIG. 10A, FIG. 10B, FIG. 10C, and FIG. 10D are charts showing sound absorption coefficients according to the various exemplary embodiments.

In the test giving the results shown in Table 1 and the chart shown in FIG. 10A, the temperature of an "empty room" was 21.7° C., and a "full room" was 22.8° C., the relative humidity was 51% and 48%, respectively, and the pressure was 994 mb in both.

As shown in Table 1 and FIG. 10A, test results illustrate the acoustic panel's 1 ability to absorb sound waves at a higher rate on both the low and high ends of the frequency spectrum. The acoustic panel 1 is able to achieve these results in part by its multi-ply core having three separate layers of sound absorbent materials (first fiberglass layer 20, wood-wool layer 30, and second fiberglass layer 40). The core is uniformly sound-absorbent across its entire surface, and sound waves are able to evenly penetrate the acoustic panel 1 due to the micro-perforations in the wood veneer panel 10. The amount of reflected sound energy in the present exemplary embodiment is reduced compared to a conventional wood veneer panel that lacks uniform sound absorbency, such as a drilled-core acoustic panel.

Also, in the acoustic panel 1, the micro-perforated wood veneer panel 10 is adhered to the first fiberglass layer 20, which gives the wood veneer panel 10 the ability to compress under the pressure of low-frequency sound waves. As sound waves pass into the interior of the acoustic panel 1 they pass through three layers of the multi-ply core. These core layers have different densities and thicknesses and thus the core absorbs sound in a broad range of frequencies. This creates an absorption curve that starts higher on the low end of the frequency spectrum and once it reaches its maximum absorption it drops off very little at higher frequencies. Accordingly, the acoustic panel 1 is suitable to absorb a broad range of frequencies, including low frequencies, making it an attractive solution in various applications.

Figure 2:
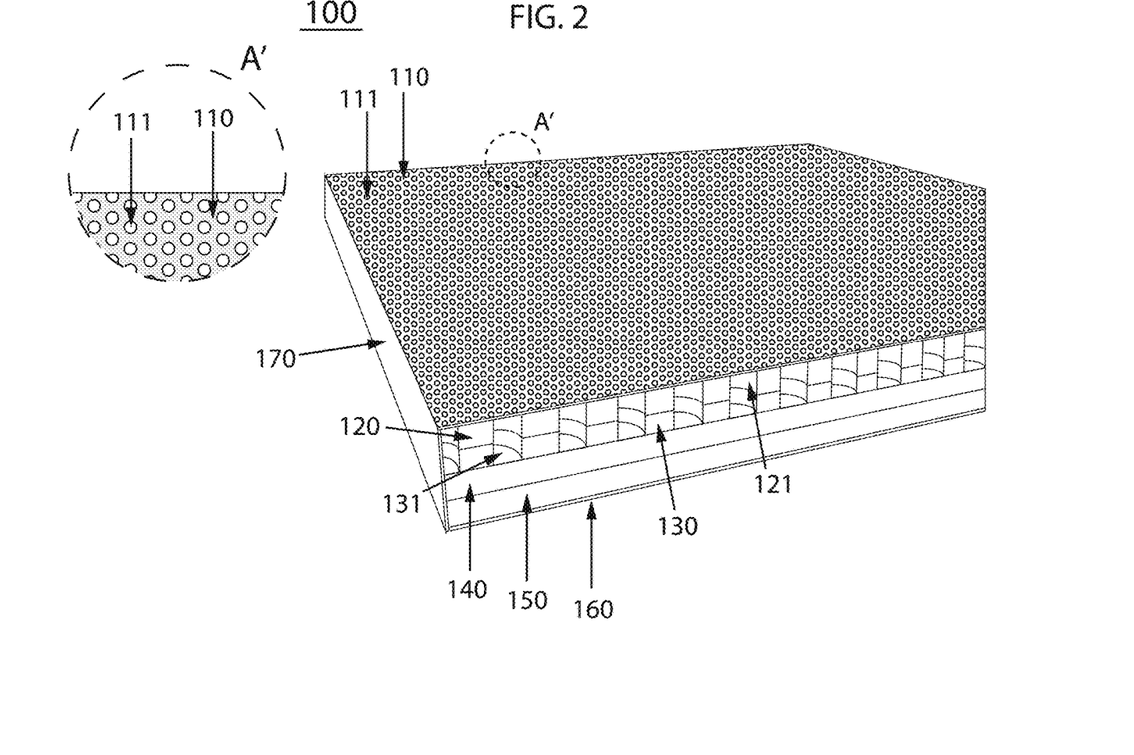
FIG. 2 is an isometric view showing an acoustic panel according to an exemplary embodiment of the present disclosure.
Figure 3:
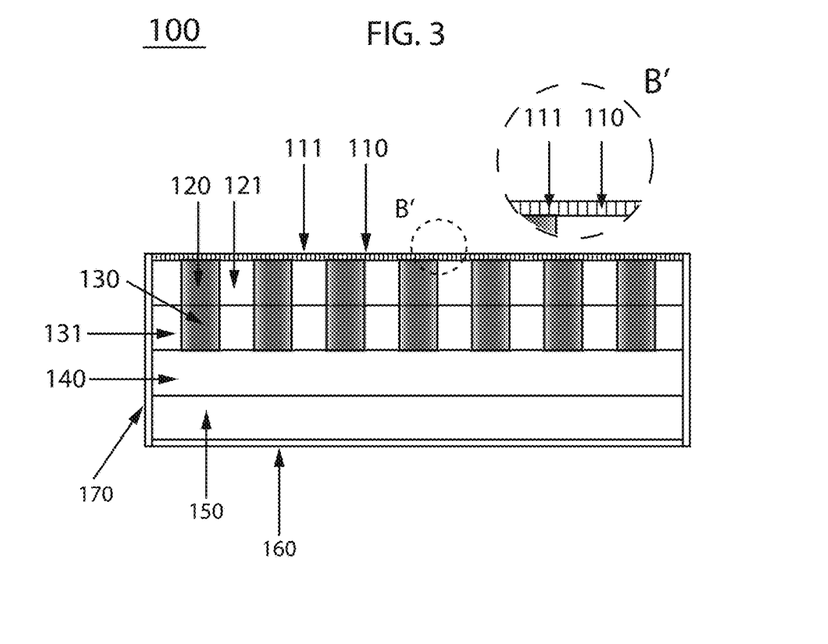
FIG. 3 is a cross-sectional view showing the acoustic panel according to the exemplary embodiment of FIG. 2.

As shown in FIG. 2, FIG. 3, FIG. 4, and FIG. 5, the acoustic panel 100 according to an exemplary embodiment includes a wood veneer panel 110 having micro-perforations 111 formed therethrough, as shown in the enlarged view of inset portions A' of FIG. 2 and B' of FIG. 3. In FIG. 2, micro-perforations 111 are shown as circles, for illustrative purposes, whereas in FIG. 3, micro-perforations 111 are shown as single vertical lines. The perforations 111 may be, for example, each about 0.5 mm in diameter, and evenly spaced throughout the entire panel 110. The wood veneer panel 110 has, for example, a wood veneer face pressed on

TABLE 1

| FREQ (HZ) | EMPTY ROOM ABSORPTION (M²) | UNCERTAINTY | FULL ROOM ABSORPTION (M²) | UNCERTAINTY | ABSORPTION COEFFICIENT | RELATIVE UNCERTAINTY |
|---|---|---|---|---|---|---|
| 80 | 4.71 | 0.450 | 5.51 | 0.234 | 0.15 | 0.095 |
| 100 | 5.29 | 0.476 | 6.33 | 0.420 | 0.19 | 0.118 |
| 125 | 5.00 | 0.282 | 6.25 | 0.279 | 0.23 | 0.074 |
| 160 | 4.27 | 0.210 | 6.26 | 0.184 | 0.37 | 0.052 |
| 200 | 4.31 | 0.167 | 6.67 | 0.062 | 0.44 | 0.033 |
| 250 | 4.85 | 0.157 | 7.56 | 0.054 | 0.51 | 0.031 |
| 315 | 4.96 | 0.136 | 8.09 | 0.094 | 0.58 | 0.031 |
| 400 | 5.18 | 0.019 | 8.57 | 0.058 | 0.63 | 0.011 |
| 500 | 5.16 | 0.041 | 8.94 | 0.175 | 0.71 | 0.034 |
| 630 | 4.83 | 0.027 | 9.17 | 0.039 | 0.81 | 0.009 |
| 800 | 4.98 | 0.044 | 9.59 | 0.016 | 0.86 | 0.009 |
| 1000 | 4.99 | 0.030 | 9.72 | 0.032 | 0.88 | 0.008 |
| 1250 | 5.34 | 0.010 | 10.03 | 0.019 | 0.88 | 0.004 |
| 1600 | 5.44 | 0.012 | 9.88 | 0.009 | 0.83 | 0.003 |
| 2000 | 5.38 | 0.016 | 9.38 | 0.010 | 0.75 | 0.004 |
| 2500 | 5.68 | 0.013 | 9.53 | 0.169 | 0.72 | 0.032 |
| 3150 | 6.38 | 0.021 | 9.74 | 0.007 | 0.63 | 0.004 |
| 4000 | 6.84 | 0.007 | 10.58 | 0.006 | 0.70 | 0.002 |
| 5000 | 7.68 | 0.002 | 11.33 | 0.005 | 0.68 | 0.001 |

NRC RATING 0.70 (Noise Reduction Coefficient)
SAA RATING 0.72 (Sound Absorption Average)

a backer layer, for example resin-impregnated wood fiber, the panel 110 having a thickness of about 1.5 mm.

The wood veneer panel 110 is disposed on a multi-ply core including absorptive, porous materials. According to the present exemplary embodiment, the core includes: a first layer 120; a second layer 130; a third layer 140; and a fourth layer 150. The first, second, third, and fourth layers 120, 130, 140, and 150 each have, for example, thicknesses of about 6 mm. The core may have greater or fewer numbers of layers depending on the thickness of the layers and the thickness of the acoustic panel 100.

The acoustic panel 100 is backed with a sheet of wood veneer 160 to balance the panel and prevent warping, the wood veneer backing sheet 160 having, for example, a thickness of about 1.5 mm. The acoustic panel 100 also has a wood veneer edgeband 170 having, for example, a thickness of about 1.5 mm that surrounds the vertical sides thereof. For the sake of illustration only, FIG. 2 omits the edgeband 170 on a front vertical side of the acoustic panel 100, in order to show the core having first, second, third, and fourth layers 120, 130, 140, and 150.

In the acoustic panel 100 according to the present exemplary embodiment, the wood veneer panel 110 is pressed onto the first layer 120. The first, second, third, and fourth layers 120, 130, 140, and 150 may be, for example, each formed from a randomly-oriented strand fiberglass board, such as a short-strand randomly-oriented fiberglass and polypropylene material. According to the present exemplary embodiment, the first layer 120 has first perforations 121 and the second layer 130 has second perforations 131 respectively formed therein. However, the first layer 120 alone may be perforated, or the first through third layers 120, 130, and 140 may be perforated. The first and second perforations 121 and 131 may, for example, each have diameters of about 7 mm, and be evenly spaced throughout the first and second layers 120 and 130, respectively. The first and second perforations 121 and 131 according to the present exemplary embodiment are cylindrical in shape, and substantially overlap each other in a direction perpendicular to the face of the acoustic panel 100.

Figure 4:
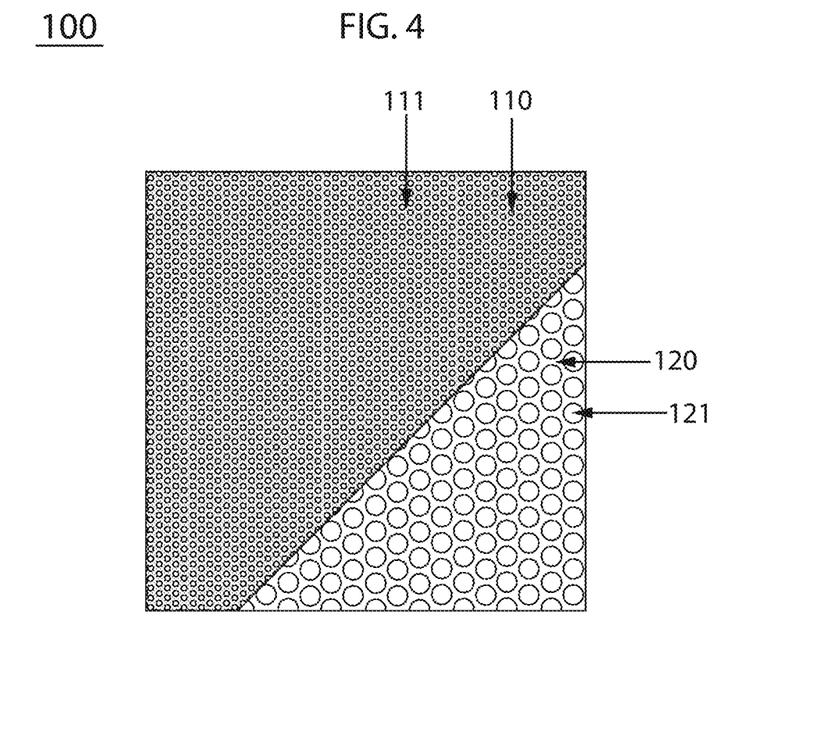
FIG. 4 is a top plan view showing the acoustic panel according to the exemplary embodiment of FIG. 2.
Figure 5:
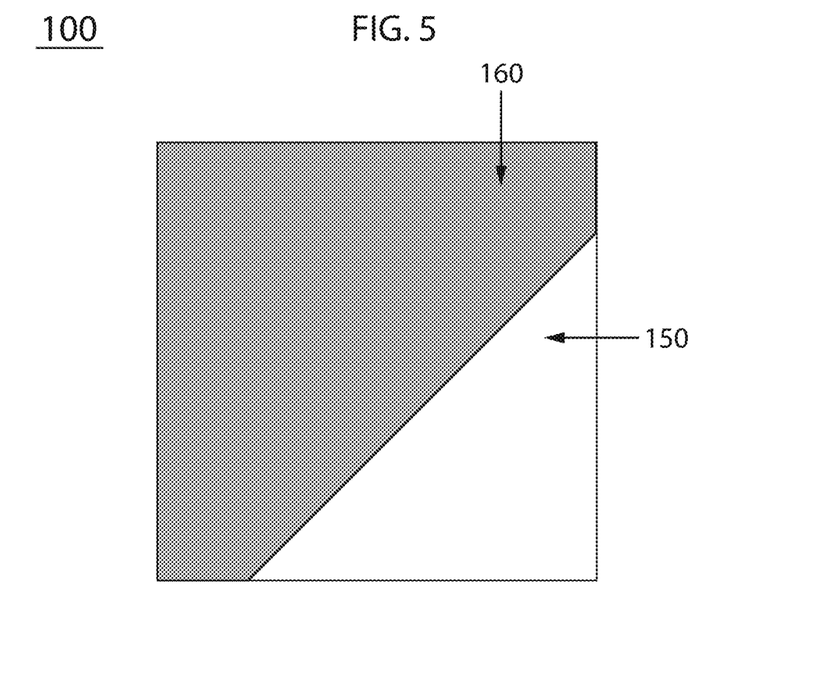
FIG. 5 is a bottom plan view showing the acoustic panel according to the exemplary embodiment of FIG. 2.

FIG. 4 shows a top view of the acoustic panel 100 with a cut-away showing the first layer 120 having cylindrical first perforations 121. Accordingly, there may be, for example, spaces substantially extending between the wood veneer panel 110 and the third layer 140, corresponding to the first and second perforations 121 and 131, as shown in the cross-sectional view of the acoustic panel 100 of FIG. 3. FIG. 5 shows a bottom view of the acoustic panel 100 showing the backing sheet 160, with a cut-away showing the fourth layer 150. The cut-aways shown in FIG. 4 and FIG. 5 are for illustrative purposes only, and not actual features of the acoustic panel 100 according to the present exemplary embodiment.

The first, second, third, and fourth layers 120, 130, 140, and 150 made of randomly-oriented strand fiberglass provides an acoustic panel 100 having a strong, rigid, and low-density core, enabling the wood veneer panel 110 to have improved dynamic response to low-frequency sound waves. Reflection of low-frequency sound waves by the wood veneer panel 110 is decreased, thus the acoustic panel 100 absorbs more of those sound waves. The first, second, third, and fourth layers 120, 130, 140, and 150 may, for example, each have a density of about 14 to 16 lb/ft$^3$. The randomly-oriented strand fiberglass increases the strength of the bond between the wood veneer panel 110 and the core.

An adhesive (not shown) is used to adhere the wood veneer panel 110 to the first layer 120 according to the present exemplary embodiment, as well as adhere the other adjacent layers 120, 130, 140, 150, and 160 in the acoustic panel 100 to each other. The adhesive may be, for example, a sheet adhesive glue which is porous and has a random web structure, and which does not melt into and fill the microperforations 111 in the wood veneer panel 110 during pressing. According to the present exemplary embodiment, the glue between the wood veneer panel 110 and the first layer 120 may, for example, have a weight of 0.7 oz, and the glue is disposed between the first layer 120 and the second layer 130, the second layer 130 and the third layer 140, and the third layer 140 and the fourth layer 150, each of these glue layers may, for example, have a weight of 1.2 oz. The 0.7 oz weight glue is used to adhere the wood veneer backing sheet 160 to the fourth layer 150, and the wood veneer edgeband 170 to the acoustic panel 100. Thus, an acoustically penetrable bond is created between the wood veneer panel 110 and the first layer 120, as well as between the other layers 120, 130, 140, and 150, so as not to impede the transmission of sound waves as they pass through the wood veneer panel 110 and into the multi-ply core, where they can be effectively absorbed.

TABLE 2

| FREQ (HZ) | EMPTY ROOM ABSORPTION (M$^2$) | UNCERTAINITY | FULL ROOM ABSORPTION (M$^2$) | UNCERTAINTY | ABSORPTION COEFFICIENT | RELATIVE UNCERTAINTY |
|---|---|---|---|---|---|---|
| 80 | 5.55 | 0.375 | 5.73 | 0.450 | 0.03 | 0.102 |
| 100 | 5.77 | 0.536 | 6.06 | 0.436 | 0.05 | 0.120 |
| 125 | 6.08 | 0.380 | 7.25 | 0.371 | 0.20 | 0.092 |
| 160 | 5.14 | 0.146 | 7.27 | 0.168 | 0.37 | 0.039 |
| 200 | 4.64 | 0.095 | 6.68 | 0.067 | 0.35 | 0.020 |
| 250 | 5.10 | 0.159 | 7.16 | 0.094 | 0.36 | 0.032 |
| 315 | 5.22 | 0.057 | 7.63 | 0.052 | 0.42 | 0.013 |
| 400 | 5.44 | 0.032 | 8.31 | 0.047 | 0.50 | 0.010 |
| 500 | 5.58 | 0.036 | 9.32 | 0.289 | 0.65 | 0.051 |
| 630 | 5.13 | 0.022 | 9.92 | 0.029 | 0.83 | 0.006 |
| 800 | 5.19 | 0.032 | 10.50 | 0.012 | 0.92 | 0.006 |
| 1000 | 5.26 | 0.025 | 10.78 | 0.015 | 0.96 | 0.005 |
| 1250 | 5.53 | 0.028 | 11.08 | 0.012 | 0.96 | 0.005 |
| 1600 | 5.56 | 0.020 | 10.94 | 0.015 | 0.93 | 0.004 |
| 2000 | 5.53 | 0.014 | 10.53 | 0.019 | 0.87 | 0.004 |
| 2500 | 5.82 | 0.011 | 10.83 | 0.146 | 0.87 | 0.025 |
| 3150 | 6.17 | 0.015 | 11.04 | 0.003 | 0.85 | 0.003 |
| 4000 | 6.66 | 0.004 | 11.03 | 0.010 | 0.76 | 0.002 |
| 5000 | 7.23 | 0.004 | 11.04 | 0.002 | 0.66 | 0.001 |

NRC RATING 0.70 (Noise Reduction Coefficient)
SAA RATING 0.72 (Sound Absorption Average)

Figure 10B:
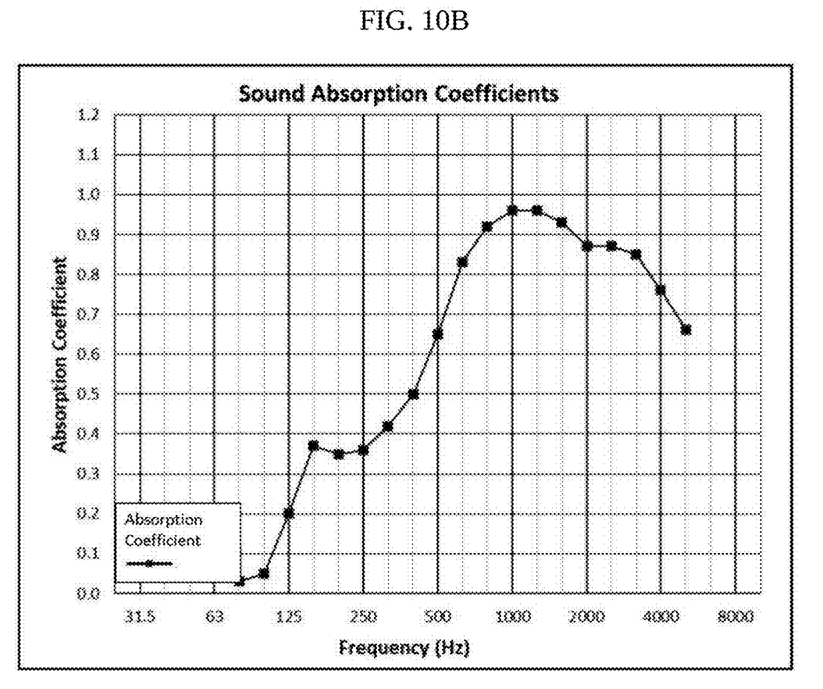

In the test giving the results shown in Table 2 and the chart shown in FIG. 10B, as well as other tests as described herein, specimens were evaluated in accordance with ASTM C423-17 "Standard Test Method for Sound Absorption and Sound Absorption Coefficients by the Reverberation Room Method" and ASTM E795-16 "Standard Practices for Mounting Test Specimens During Sound Absorption Tests." The temperature of an "empty room" was 22.0° C., and a "full room" was 21.8° C., the relative humidity was 47% and 48%, respectively, the pressure was 1013 mb and 1015 mb, respectively. The acoustic panel 100 specimen area was 5.76 m², the thickness was about 23 mm, and the weight was about 8 kg/m².

acoustic panel 100 according to the present exemplary embodiment is suitable to absorb a broad range of frequencies, including low frequencies of 400 Hz and smaller, making it an attractive solution in various applications.

Specifically, the acoustic panel 100 has a noise reduction coefficient (NRC) rating of about 0.7, and a sound absorption average (SAA) of about 0.72. The NRC is the arithmetic average of the sound absorption coefficients at 250, 500, 1000, and 2000 Hz, where the sound absorption coefficient is the full room absorption minus the empty room absorption divided by the area of the sample. NRC is unitless and ranges from 0 to 1. The SAA is the arithmetic average of the sound absorption coefficients at frequencies ranging from 200 to 2500 Hz. SAA is unitless and ranges from 0 to 1.

TABLE 3

| FREQ (HZ) | EMPTY ROOM ABSORPTION (M²) | UNCERTAINITY | FULL ROOM ABSORPTION (M²) | UNCERTAINTY | ABSORPTION COEFFICIENT | RELATIVE UNCERTAINTY |
|---|---|---|---|---|---|---|
| 80 | 5.54 | 0.452 | 5.93 | 0.547 | 0.07 | 0.122 |
| 100 | 5.23 | 0.590 | 6.04 | 0.708 | 0.14 | 0.158 |
| 125 | 5.87 | 0.240 | 7.74 | 0.274 | 0.32 | 0.063 |
| 160 | 5.14 | 0.192 | 7.23 | 0.208 | 0.36 | 0.049 |
| 200 | 4.72 | 0.140 | 6.60 | 0.081 | 0.32 | 0.028 |
| 250 | 5.13 | 0.117 | 6.78 | 0.054 | 0.28 | 0.022 |
| 315 | 5.27 | 0.056 | 6.83 | 0.057 | 0.27 | 0.014 |
| 400 | 5.45 | 0.050 | 7.05 | 0.050 | 0.27 | 0.012 |
| 500 | 5.54 | 0.060 | 7.15 | 0.114 | 0.28 | 0.022 |
| 630 | 5.16 | 0.010 | 6.94 | 0.031 | 0.31 | 0.006 |
| 800 | 5.18 | 0.029 | 7.07 | 0.028 | 0.32 | 0.007 |
| 1000 | 5.22 | 0.019 | 7.21 | 0.023 | 0.34 | 0.005 |
| 1250 | 5.57 | 0.014 | 7.68 | 0.008 | 0.36 | 0.003 |
| 1600 | 5.59 | 0.014 | 7.77 | 0.007 | 0.37 | 0.003 |
| 2000 | 5.53 | 0.010 | 7.67 | 0.091 | 0.37 | 0.016 |
| 2500 | 5.80 | 0.014 | 8.45 | 0.217 | 0.45 | 0.037 |
| 3150 | 6.16 | 0.009 | 8.72 | 0.004 | 0.44 | 0.002 |
| 4000 | 6.66 | 0.006 | 9.23 | 0.004 | 0.44 | 0.001 |
| 5000 | 7.22 | 0.003 | 9.48 | 0.010 | 0.39 | 0.002 |

NRC RATING 0.30 (Noise Reduction Coefficient)
SAA RATING 0.33 (Sound Absorption Average)

As shown in Table 2 and FIG. 10B, test results illustrate the acoustic panel's 100 improved ability to absorb sound waves on both the low (≤400 Hz) and high ends of the frequency spectrum. The acoustic panel 100 according to the present exemplary embodiment is able to achieve these results in part by its multi-ply core having four separate layers of sound absorbent material (first through fourth layers 120, 130, 140, and 150). Sound waves are able to evenly penetrate the acoustic panel 100 due to the micro-perforations 111 in the wood veneer panel 110 and the porous, randomly-structured adhesive disposed between the wood veneer panel 110 and the core. Thus, the amount of reflected sound energy in the present exemplary embodiment is reduced compared to a conventional wood veneer panel.

Also, as sound waves pass into the interior of the acoustic panel 100 they pass through the first, second, third, and fourth layers 120, 130, 140, and 150 of the multi-ply core. Due to the perforations 121 and 131, the core has varying thicknesses and thus absorbs sound in a broad range of frequencies. First and second layers 120 and 130 having respective perforations 121 and 131 reduces the density and increases the surface area of these layers, resulting in decreased weight and increased sound absorbency of the acoustic panel 100. This porous core creates an absorption curve that starts higher on the low end of the frequency spectrum and once it reaches its maximum absorption it drops off very little at higher frequencies. Accordingly, the In the test giving the results shown in Table 3 and the chart shown in FIG. 10C, the temperature of an "empty room" was 20.9° C., and a "full room" was 20.8° C., the relative humidity was 50% and 49%, respectively, and the pressure was 1006 mb and 1005 mb, respectively. The specimen area was 5.83 m², the thickness was about 24 mm, and the weight was about 5 kg/m².

Figure 10C:
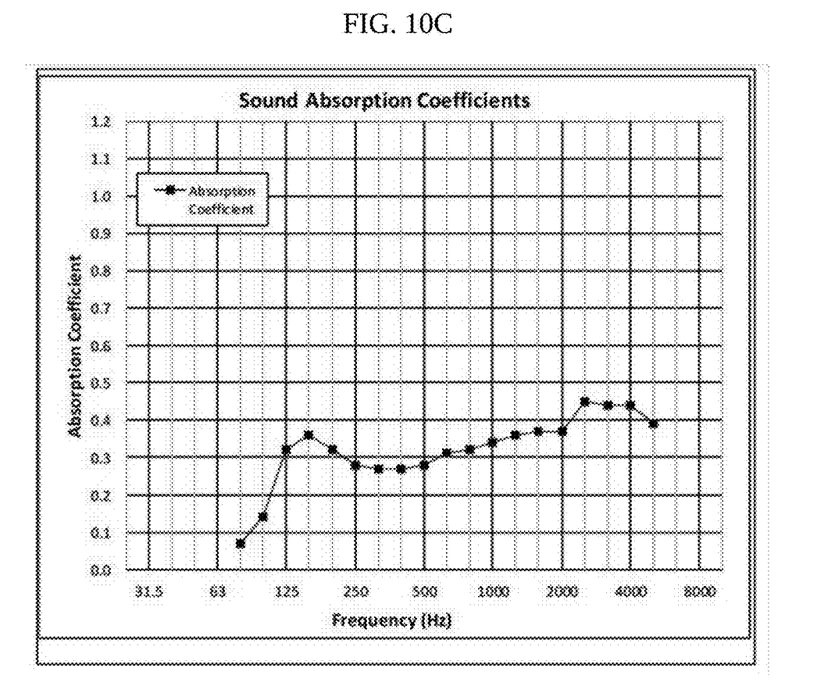

The test results shown in Table 3 and FIG. 10C correspond to a comparative example panel (not shown in the drawings) made of unperforated randomly-oriented strand fiberglass. The comparative panel had a noise reduction coefficient rating of about 0.3, and a sound absorption average of about 0.33.

Figure 6:
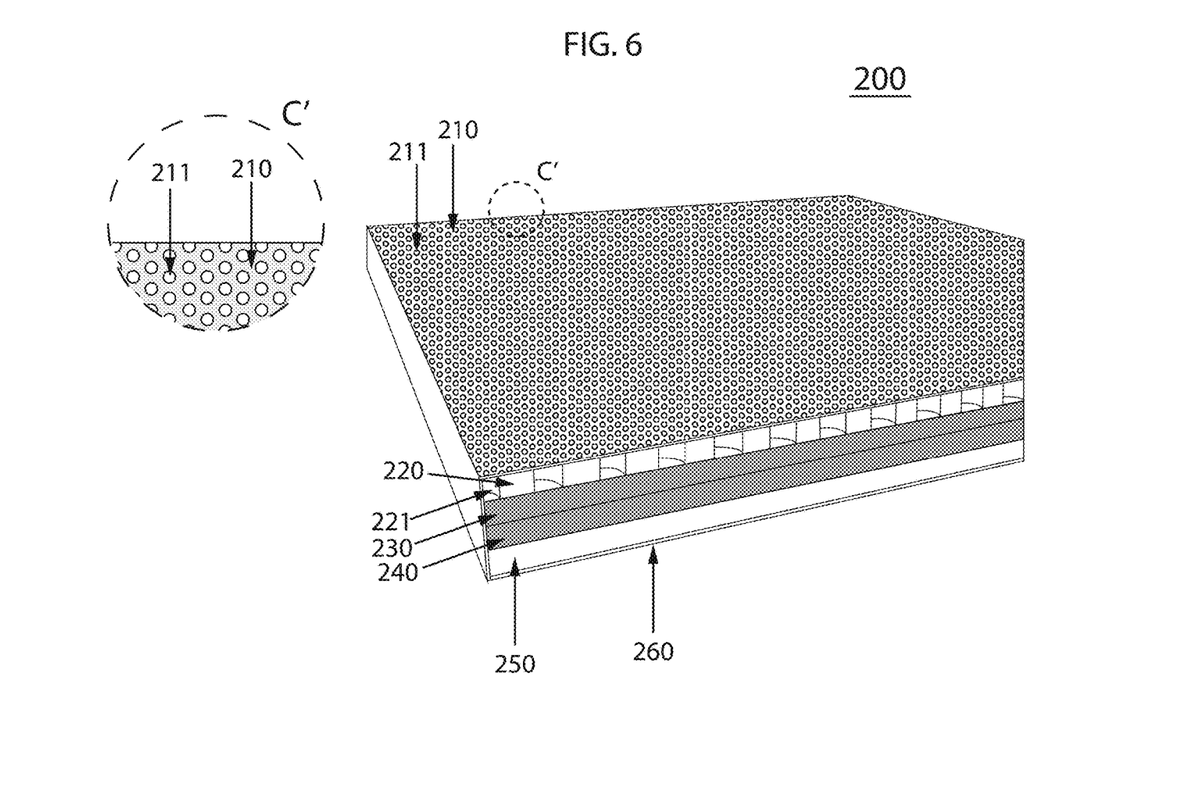
FIG. 6 is an isometric view showing an acoustic panel according to an exemplary embodiment of the present disclosure.
Figure 7:
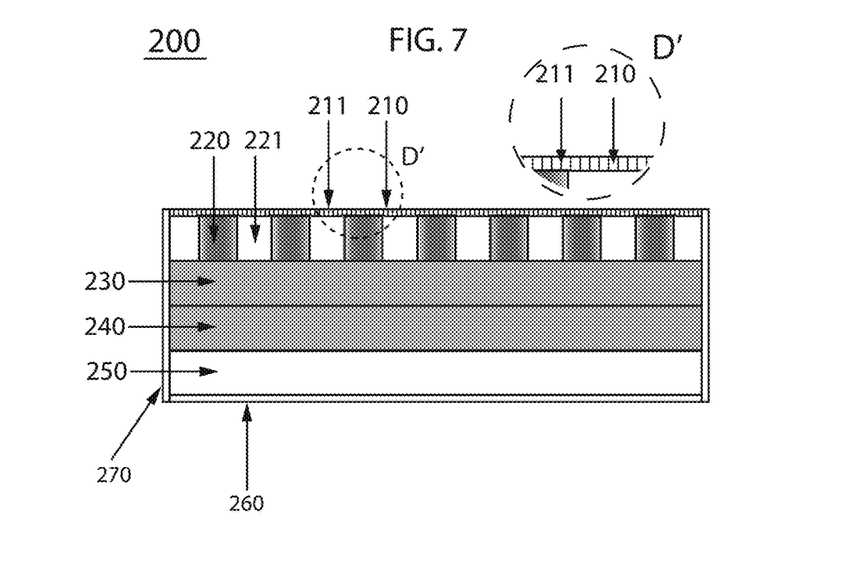
FIG. 7 is a cross-sectional view showing the acoustic panel according to the exemplary embodiment of FIG. 6.

As shown in FIG. 6, FIG. 7, FIG. 8, and FIG. 9, the acoustic panel 200 according to an exemplary embodiment includes a wood veneer panel 210 having micro-perforations 211 formed therethrough, as shown in the enlarged view of inset portions C' of FIG. 6 and D' of FIG. 7. In FIG. 6, micro-perforations 211 are shown as circles, for illustrative purposes, whereas in FIG. 7, micro-perforations 211 are shown as single vertical lines. The perforations 211 may be, for example, each about 0.5 mm in diameter, and evenly spaced throughout the entire panel 210. The wood veneer panel 210 has, for example, a wood veneer face pressed on a backer layer, for example resin-impregnated wood fiber, the panel 210 having a thickness of about 1.5 mm.

The acoustic panel 200 according to the present exemplary embodiment may be substantially similar in various respects to the acoustic panel 100 as described above with respect to FIG. 2, FIG. 3, FIG. 4, and FIG. 5 of the present disclosure, and the disclosure thereof is incorporated herein by reference, and any repeated disclosure may be omitted for the sake of brevity. Likewise, the disclosure with respect to the acoustic panel 200 described in connection with FIG. 6, FIG. 7, FIG. 8, and FIG. 9 is incorporated by reference into the exemplary embodiment described with respect to FIG. 2, FIG. 3, FIG. 4, and FIG. 5 above. The disclosure made with respect to the acoustic panel 1 as described above with respect to FIG. 1 is incorporated herein by reference into the exemplary embodiments described with respect to FIG. 2, FIG. 3, FIG. 4, FIG. 5, FIG. 6, FIG. 7, FIG. 8, and FIG. 9, and any repeated disclosure may be omitted for the sake of brevity.

The wood veneer panel 210 is disposed on a multi-ply core including absorptive, porous materials. According to the present exemplary embodiment, the core includes: a first layer 220; a second layer 230; a third layer 240; and a fourth layer 250. The first, second, third, and fourth layers 220, 230, 240, and 250 each have, for example, thicknesses of about 6 mm. The core may have greater or fewer numbers of layers depending on the thickness of the layers and the thickness of the acoustic panel 200.

The acoustic panel 200 is backed with a sheet of wood veneer 260 to balance the panel and prevent warping, the wood veneer backing sheet 260 having, for example, a thickness of about 1.5 mm. The acoustic panel 200 also has a wood veneer edgeband 270 having, for example, a thickness of about 1.5 mm that surrounds the vertical sides thereof. For the sake of illustration only, FIG. 6 omits the edgeband 270 on a front vertical side of the acoustic panel 200, in order to show the core having first, second, third, and fourth layers 220, 230, 240, and 250.

In the acoustic panel 200 according to the present exemplary embodiment, the wood veneer panel 210 is pressed onto the first layer 220. The first and fourth layers 220 and 250 may be, for example, each formed from a randomly-oriented strand fiberglass board, such as a short-strand randomly-oriented fiberglass and polypropylene material. The first layer 220 has first perforations 221 formed therein. The first perforations 221 may, for example, have diameters of about 7 mm, and be evenly spaced throughout the first layer 220. The first perforations 221 according to the present exemplary embodiment are cylindrical in shape, but may have a variety of shapes.

Figure 8:
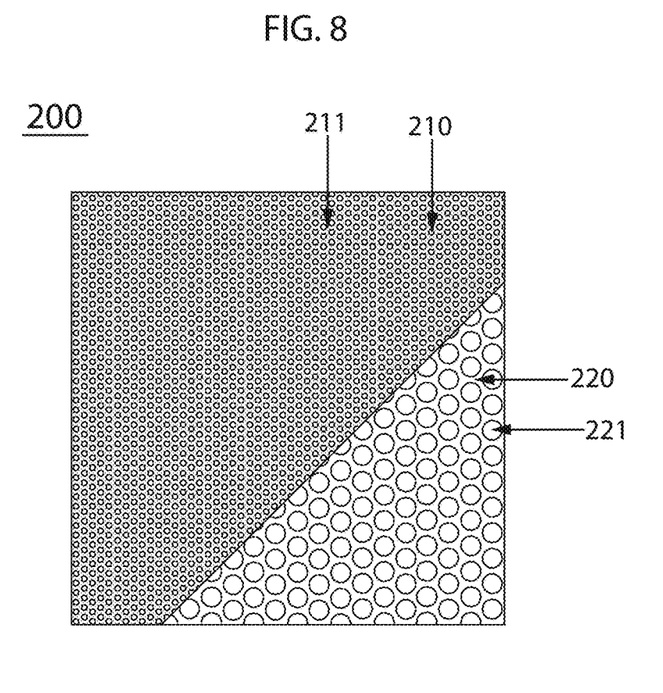
FIG. 8 is a top plan view showing the acoustic panel according to the exemplary embodiment of FIG. 6.
Figure 9:
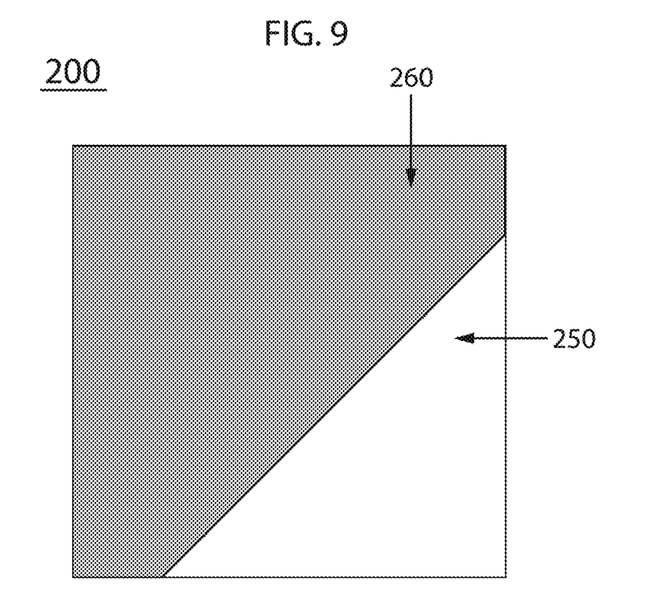
FIG. 9 is a bottom plan view showing the acoustic panel according to the exemplary embodiment of FIG. 6.

FIG. 8 shows a top view of the acoustic panel 200 with a cut-away showing the first layer 220 having cylindrical first perforations 221. Accordingly, there may be, for example, spaces substantially extending between the wood veneer panel 210 and the second layer 230, corresponding to the first perforations 221. FIG. 9 shows a bottom view of the acoustic panel 200 showing the backing sheet 260, with a cut-away showing the fourth layer 250. The cut-aways shown in FIG. 8 and FIG. 9 are for illustrative purposes only, and not actual features of the acoustic panel 200 according to the present exemplary embodiment.

In the acoustic panel 200 according to the present exemplary embodiment, the second and third layers 230 and 240 are made of very low density long-strand fiberglass, enabling the acoustic panel 200 to have improved dynamic response to low-frequency sound waves. Reflection of low-frequency (400 Hz and lower) sound waves by the wood veneer panel 210 is decreased, thus the acoustic panel 200 absorbs more of those sound waves. Both the second and third layers 230 and 240 may, for example, each have a fiberglass density of about 18 lb/ft$^3$.

The first and fourth layers 220 and 250 made of randomly-oriented strand fiberglass and second and third layers 230 and 240 made of long-strand fiberglass provide an acoustic panel 200 having a strong, rigid, and low-density core, enabling the wood veneer panel 210 to have improved dynamic response to low-frequency sound waves. Reflection of low-frequency sound waves by the wood veneer panel 210 is decreased, thus the acoustic panel 200 absorbs more of those sound waves. The randomly-oriented strand fiberglass increases the strength of the bond between the wood veneer panel 210 and the core.

An adhesive (not shown) is used to adhere the wood veneer panel 210 to the first layer 220 according to the present exemplary embodiment, as well as adhere the other adjacent layers 220, 230, 240, 250, and 260 in the acoustic panel 200 to each other. The adhesive may be, for example, a sheet adhesive glue which is porous and has a random web structure, and which does not melt into and fill the micro-perforations in the wood veneer panel 210 during pressing. According to the present exemplary embodiment, the glue between the wood veneer panel 210 and the first layer 220 may, for example, have a weight of 0.7 oz, and the glue is disposed between the first layer 220 and the second layer 230, the second layer 230 and the third layer 240, and the third layer 240 and the fourth layer 250, each of these glue layers may, for example, have a weight of 1.2 oz. The 0.7 oz weight glue is used to adhere the backing sheet 260 to the fourth layer 250, and the edgeband 270 to the acoustic panel 200. Thus, an acoustically penetrable bond is created between the wood veneer panel 210 and the first layer 220, as well as between the other layers 220, 230, 240, and 250, so as not to impede the transmission of sound waves as they pass through the wood veneer panel 210 and into the multi-ply core, where they can be effectively absorbed.

TABLE 4

| FREQ (HZ) | EMPTY ROOM ABSORPTION (M$^2$) | UNCERTAINITY | FULL ROOM ABSORPTION (M$^2$) | UNCERTAINTY | ABSORPTION COEFFICIENT | RELATIVE UNCERTAINTY |
|---|---|---|---|---|---|---|
| 80 | 5.55 | 0.375 | 5.79 | 0.559 | 0.04 | 0.117 |
| 100 | 5.77 | 0.536 | 6.17 | 0.400 | 0.07 | 0.116 |
| 125 | 6.08 | 0.380 | 7.11 | 0.319 | 0.18 | 0.086 |
| 160 | 5.14 | 0.146 | 7.31 | 0.152 | 0.38 | 0.037 |
| 200 | 4.64 | 0.095 | 6.96 | 0.049 | 0.40 | 0.019 |
| 250 | 5.10 | 0.159 | 7.57 | 0.052 | 0.43 | 0.029 |
| 315 | 5.22 | 0.057 | 8.26 | 0.058 | 0.53 | 0.014 |
| 400 | 5.44 | 0.032 | 8.88 | 0.046 | 0.60 | 0.010 |
| 500 | 5.58 | 0.036 | 9.84 | 0.259 | 0.74 | 0.045 |
| 630 | 5.13 | 0.022 | 10.23 | 0.023 | 0.89 | 0.006 |
| 800 | 5.19 | 0.032 | 10.51 | 0.016 | 0.92 | 0.006 |
| 1000 | 5.26 | 0.025 | 10.64 | 0.021 | 0.93 | 0.006 |

TABLE 4-continued

| FREQ (HZ) | EMPTY ROOM ABSORPTION (M²) | UNCERTAINTY | FULL ROOM ABSORPTION (M²) | UNCERTAINTY | ABSORPTION COEFFICIENT | RELATIVE UNCERTAINTY |
|---|---|---|---|---|---|---|
| 1250 | 5.53 | 0.028 | 10.79 | 0.019 | 0.91 | 0.006 |
| 1600 | 5.56 | 0.020 | 10.88 | 0.015 | 0.92 | 0.004 |
| 2000 | 5.53 | 0.014 | 10.64 | 0.047 | 0.89 | 0.008 |
| 2500 | 5.82 | 0.011 | 10.92 | 0.099 | 0.88 | 0.017 |
| 3150 | 6.17 | 0.015 | 10.64 | 0.006 | 0.78 | 0.003 |
| 4000 | 6.66 | 0.004 | 10.81 | 0.003 | 0.72 | 0.001 |
| 5000 | 7.23 | 0.004 | 11.10 | 0.005 | 0.67 | 0.001 |

NRC RATING 0.75 (Noise Reduction Coefficient)
SAA RATING 0.75 (Sound Absorption Average)

Figure 10D:
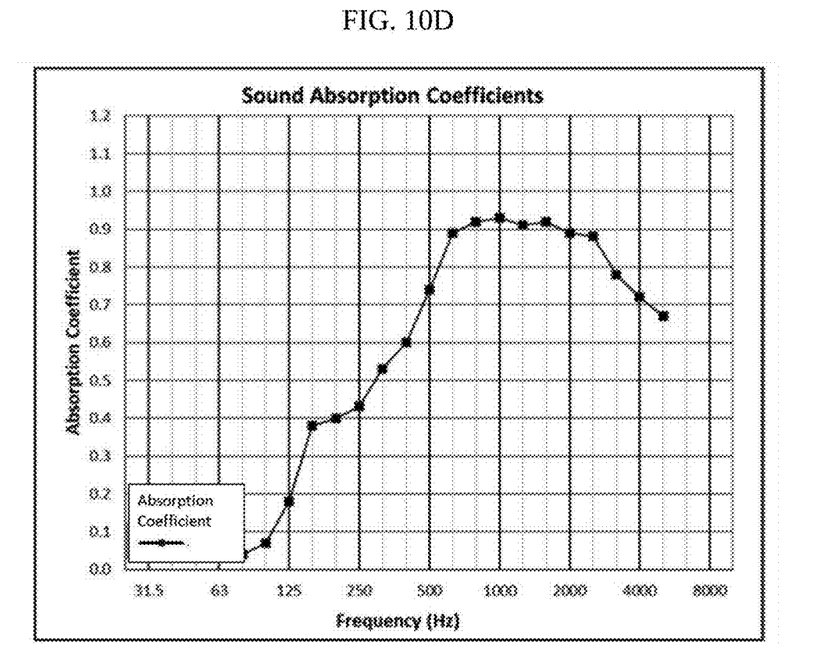

In the test giving the results shown in Table 4 and the chart shown in FIG. 10D, the temperature of an "empty room" was 22.0° C., and a "full room" was 21.6° C., the relative humidity was 47% and 48%, respectively, and the pressure was 1013 mb and 1015 mb, respectively. The acoustic panel 200 specimen area was 5.76 m², the thickness was about 24 mm, and the weight was about 7.5 kg/m²

As shown in Table 4 and FIG. 10D, test results illustrate the acoustic panel's 200 improved ability to absorb sound waves at a higher rate on both the low (≤400 Hz) and high ends of the frequency spectrum. The acoustic panel 200 according to the present exemplary embodiment is able to achieve these results in part by its multi-ply core having four separate layers of sound absorbent material (first through fourth layers 220, 230, 240, and 250). Sound waves are able to evenly penetrate the acoustic panel 200 due to the micro-perforations 211 in the wood veneer panel 210 and the porous, randomly-structured adhesive disposed between the wood veneer panel 210 and the core. Thus, the amount of reflected sound energy in the present exemplary embodiment is reduced compared to a conventional wood veneer panel.

Also, as sound waves pass into the interior of the acoustic panel 200 they pass through first, second, third, and fourth layers 220, 230, 240, and 250 of the multi-ply core. Due to the perforations 221 in the first layer 220, the core has varying thicknesses and thus absorbs sound in a broad range of frequencies. First layer 220 having perforations 221 reduces the density and increases the surface area of this layer, resulting in decreased weight and increased sound absorbency of the acoustic panel 200. Also, the combination of randomly-oriented strand fiberglass layers and long-strand fiberglass layers in the core further contributes to the broad frequency range absorption. The porous first layer 220 and combination of materials in first, second, third, and fourth layers 220, 230, 240, and 250 creates an absorption curve that starts higher on the low end of the frequency spectrum and once it reaches its maximum absorption it drops off very little at higher frequencies. Accordingly, the acoustic panel 200 is suitable to absorb a broad range of frequencies, including low frequencies of 400 Hz and smaller, making it an attractive solution in various applications. Specifically, the acoustic panel 200 has a noise reduction coefficient (NRC) rating of about 0.75, and a sound absorption average (SAA) of about 0.75.

It will be apparent to those skilled in the art that various modifications and variation can be made in the present disclosure without departing from the spirit or scope thereof.

What is claimed is:

1. An acoustic panel, comprising:
a fiberglass layer; and
a panel disposed on the fiberglass layer, the panel comprising first perforations formed therethrough,
wherein:
the acoustic panel has a noise reduction coefficient (NRC) of at least 0.7;
the fiberglass layer comprises second perforations formed therein; and
the panel comprises a wood veneer layer and a polypropylene layer having a thickness of about 1.5 mm, and the fiberglass layer has a thickness in a range of about 20.0 to 24.0 mm.

2. The acoustic panel of claim 1, wherein:
the first perforations are evenly spaced across a face of the panel, and have a diameter of about 0.5 mm; and
the second perforations are evenly spaced across a face of the fiberglass layer, and have a diameter of about 7.0 mm.

3. The acoustic panel of claim 2, wherein the second perforations have uniform depths in a range of about 6.0 to 12.0 mm.

4. The acoustic panel of claim 3, wherein the NRC is in a range of 0.7 to 0.75.

5. The acoustic panel of claim 4, wherein the fiberglass layer comprises a randomly-oriented strand fiberglass layer having a density in a range of about 14.0 to 16.0 lb/ft³.

6. The acoustic panel of claim 5, wherein the randomly-oriented strand fiberglass layer has a thickness in a range of 6.0 to 24.0 mm.

7. An acoustic panel, comprising:
a fiberglass layer comprising second perforations formed therein; and
a wood veneer panel disposed on the fiberglass layer, the wood veneer panel comprising first perforations formed therethrough,
wherein:
the first perforations have a diameter of about 0.5 mm and the second perforations have a diameter of about 7.0 mm, and
the acoustic panel has a noise reduction coefficient (NRC) in a range of 0.7 to 0.75.

8. The acoustic panel of claim 7, wherein the wood veneer panel comprises a wood veneer layer and a polypropylene layer, the wood veneer panel having a thickness of about 1.5 mm.

9. The acoustic panel of claim 8, wherein the fiberglass layer comprises a first randomly-oriented strand fiberglass layer having a thickness of about 6.0 mm and second perforations formed therethrough.

10. The acoustic panel of claim 9, wherein the fiberglass layer further comprises:
a second randomly-oriented strand fiberglass layer having a thickness of about 6.0 mm and second perforations formed therethrough;
a third randomly-oriented strand fiberglass layer; and
a fourth randomly-oriented strand fiberglass layer.

11. The acoustic panel of claim 10, further comprising an adhesive respectively disposed between the wood veneer panel and the first randomly-oriented strand fiberglass layer, the first randomly-oriented strand fiberglass layer and the second randomly-oriented strand fiberglass layer, the second randomly-oriented strand fiberglass layer and the third randomly-oriented strand fiberglass layer, and the third randomly-oriented strand fiberglass layer and the fourth randomly-oriented strand fiberglass layer.

12. The acoustic panel of claim 11, wherein the adhesive comprises an acoustically penetrable, random web-structured sheet adhesive.

13. The acoustic panel of claim 9, wherein:
the fiberglass layer further comprises:
a second randomly-oriented strand fiberglass layer;
a first long-strand fiberglass layer; and
a second long-strand fiberglass layer, and
the first long-strand fiberglass layer and the second long-strand fiberglass layer are disposed between the first randomly-oriented strand fiberglass layer and the second randomly-oriented strand fiberglass layer.

14. The acoustic panel of claim 13, further comprising an adhesive respectively disposed between the wood veneer panel and the first randomly-oriented strand fiberglass layer, the first randomly-oriented strand fiberglass layer and the first long-strand fiberglass layer, the first long-strand fiberglass layer and the second long-strand fiberglass layer, and the second long-strand fiberglass layer and the second randomly-oriented strand fiberglass layer.

15. The acoustic panel of claim 14, wherein the adhesive comprises an acoustically penetrable, random web-structured sheet adhesive.

\* \* \* \* \*